(12) United States Patent
Inamori

(10) Patent No.: US 6,236,392 B1
(45) Date of Patent: May 22, 2001

(54) DISPLAY CONTROL CIRCUIT

(75) Inventor: Yoshimitsu Inamori, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/124,081

(22) Filed: Jul. 29, 1998

(30) Foreign Application Priority Data

Aug. 5, 1997 (JP) ................................. P9-210949

(51) Int. Cl.[7] .................................................. G09G 5/00
(52) U.S. Cl. .................... 345/204; 345/113; 345/115; 348/563
(58) Field of Search ........................... 345/113, 114, 345/115, 116, 204, 214; 348/563–567, 569, 589, 586

(56) References Cited

U.S. PATENT DOCUMENTS

| | | | |
|---|---|---|---|
| 4,470,042 | * 9/1984 | Barnich et al. | 340/721 |
| 4,675,737 | * 6/1987 | Fujino et al. | 358/183 |
| 4,899,139 | * 2/1990 | Ishimochi et al. | 340/721 |
| 5,523,958 | * 6/1996 | Takeuchi | 364/514 |
| 5,541,663 | * 7/1996 | Ohno | 348/478 |
| 5,828,358 | * 10/1998 | Mota et al. | 345/133 |
| 5,995,161 | * 11/1999 | Gadre et al. | 348/564 |
| 6,046,777 | * 4/2000 | Patton et al. | 348/565 |

FOREIGN PATENT DOCUMENTS 1-289383  11/1989  (JP).

* cited by examiner

*Primary Examiner*—Bipin Shalwala
*Assistant Examiner*—Jimmy H. Nguyen
(74) *Attorney, Agent, or Firm*—Nixon & Vanderhye P.C.

(57) ABSTRACT

It is an object of the invention to provide a display control circuit capable of superimposing superimpose data which can be optionally set on an external image. When a superimposing function is set to ON, the optional superimpose data is preset by a software in a display DRAM of the display control circuit. A superimpose data latch temporarily latches the superimpose data stored in the display DRAM in accordance with a timing signal generated from a memory timing generator. The superimpose data is output to a data comparing/switching circuit in synchronization with the timing of tuner image data. The data comparing/switching circuit outputs overlap data, which is obtained by superimposing the superimpose data on the tuner image data, to a TFT liquid crystal panel in accordance with the timing signal generated from a display timing generator. Thus, the optional superimpose data can be superimposed on the external image.

8 Claims, 8 Drawing Sheets

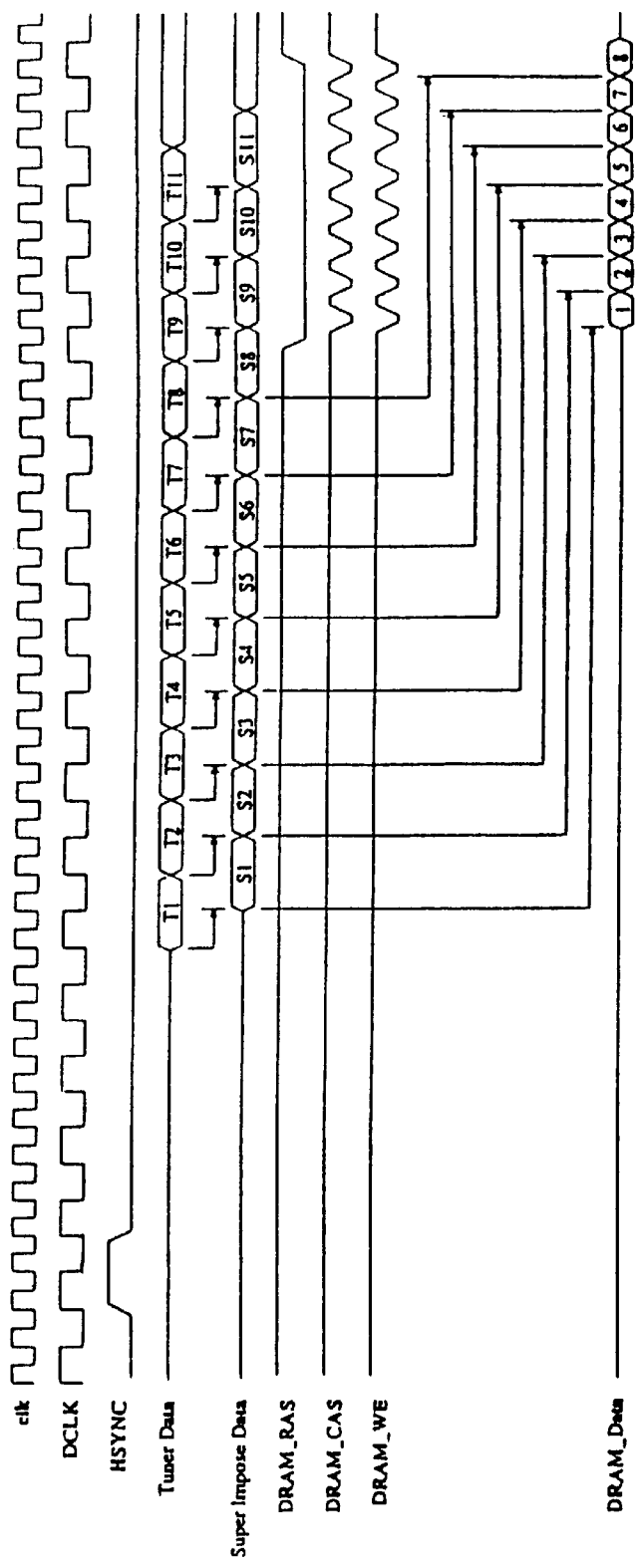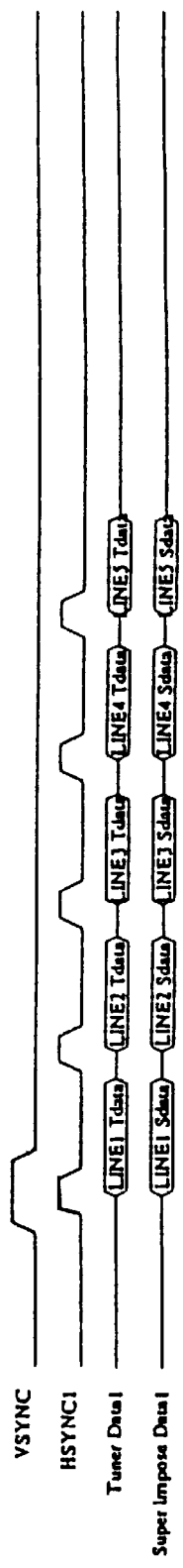
FIG. 6A
FIG. 6B

DISPLAY CONTROL CIRCUIT

BACKGROUND OF THE INVENTION

1. Field of the Invention

The present invention relates to a display control circuit having a superimposing/display capturing function for superimposing another image on an external image and displaying the resultant image.

2. Description of the Related Art

Heretofore, in the case of displaying an external image such as a television broadcast image on a display of an information processing apparatus such as a personal computer and a portable information terminal or a display apparatus of a television broadcast receiver, etc., a superimposing function has been used in order to superimpose a different image on the external image and display the images simultaneously.

FIG. 7 shows an exemplary constitution for carrying out the superimposing function for the television broadcast image in the conventional information processing apparatus having a liquid crystal display (hereinafter, referred to as "LCD").

A tuner section 1 comprises a television broadcast wave receiving antenna 2 and a tuner block 3. The television broadcast wave receiving antenna 2 receives a television broadcast wave transmitted by an NTSC system (National Television System Committee system: employed in Japan, U.S.A., etc.), a PAL system (Phase Alternation by Line system: employed in some countries in Europe) or the like. The tuner block 3 detects a component associated with the image from the television broadcast wave received by the television broadcast wave receiving antenna 2 and then extracts an analog signal. The analog signal converted by the tuner block 3 includes tuner image data and a control signal such as a horizontal synchronizing signal HSYNC, a vertical synchronizing signal VSYNC and a data latch clock DCLK.

The analog signal output from the tuner section 1 is input to an on-screen display 4 (hereinafter, referred to as "OSD"). The OSD 4 stores preset superimpose data such as a channel display in its internal ROM or the like. When the superimposing function is set to ON by software, the OSD 4 superimposes the superimpose data on the input tuner image data in the state of the analog signal and then outputs the resultant image data as external image data. On the other hand, when the superimposing function is set to OFF, the tuner image data is output as the external image data as it is. An A/D converter 5 converts the external image data input from the OSD 4 into a digital signal and then outputs the digital signal to a display control circuit 6. The display control circuit 6 comprises a tuner corresponding type LCD controller 7 and a display dynamic RAM 8 (hereinafter, referred to as "DRAM"). The tuner corresponding type LCD controller 7 includes an external image data latch 9, a timing generator 10 and a display data latch 12.

The digitized external image data is temporarily latched in the external image data latch 9. At the same time, the control signal such as the horizontal synchronizing signal HSYNC, the vertical synchronizing signal VSYNC and the data latch clock DCLK is input to the timing generator 10. In accordance with the input control signal, the timing generator 10 generates a timing signal for storing the external image data latched in the external image data latch 9 in the display DRAM 8. The timing generator 10 also generates a timing signal for outputting the image data to a thin film transistor (hereinafter, referred to as "TFT") liquid crystal panel 15.

The display data latch 12 temporarily latches display data stored in the display DRAM 8 therein and then outputs the display data to the TFT liquid crystal panel 15 in accordance with the timing signal generated from the timing generator 10.

FIG. 8 shows an exemplary constitution for carrying out the superimposing function for the television image in a conventional liquid crystal television broadcast receiver. The same elements as the elements in FIG. 7 are denoted by the same reference numerals in FIG. 8, and the description thereof is omitted.

The liquid crystal television broadcast receiver does not need the display DRAM. A tuner corresponding type LCD controller 16 includes a TFT panel controller 17 as well as the external image data latch 9 and the timing generator 10. The external image data temporarily latched in the external image data latch 9 is output directly to the TFT panel controller 17 in accordance with the timing signal generated from the timing generator 10. At the same time, the timing generator 10 outputs a display timing signal to the TFT panel controller 17. The TFT panel controller 17 outputs the external image data to the TFT liquid crystal panel 15 in accordance with the display timing signal.

Disadvantageously, the conventional apparatus for carrying out the superimposing function can superimpose only definite data, for example, the channel display, etc. recorded on the ROM contained in the OSD 4 of FIGS. 7 and 8. Furthermore, when the superimpose data is superimposed on the tuner image data, the superimposition is carried out in the state of the analog signal. Thus, it is impossible to designate a delicate color of the superimpose data, to designate a fine area of the superimpose data and to set other options. Therefore, the superimposed displayed image is prone to blur.

The prior art for partially solving the above-described problem is a liquid crystal television drive circuit disclosed in Japanese Unexamined Patent Publication JP-A 1-289383 (1989). This liquid crystal television drive circuit performs the superimposition by the use of a digital code. The image data digitized by the A/D converter is synthesized with digital character data for converting the digital code by the use of a character generator and a parallel/serial converting circuit, whereby the character data and image information are displayed at the same time. Since this liquid crystal television driving apparatus superimposes superimpose data, that is, the character data on the image data in the state of the digital signal, the above-described problem is partially solved. However, since the superimpose data is the digital data for converting the character data in parallel/in series, the contents of the superimpose data are basically limited to character information.

Moreover, when a display screen is captured by the conventional information processing apparatus shown in FIG. 7, since the external image data is once stored in the display DRAM 8, the display screen can be captured into the information processing apparatus without any need for a special operation. However, since the display DRAM 8 performs both capture and read of the image data, the display DRAM 8 is operated at very high speed and thus a current consumed for refreshing the display DRAM 8 is increased. More specifically, the DRAM operated at low speed is desirable for the display DRAM incorporated in the portable information terminal.

SUMMARY OF THE INVENTION

It is an object of the invention to provide a display control circuit which is capable of superimposing optionally settable superimpose data on an external image and of readily capturing the external image.

According to a first aspect of the invention, there is provided a display control circuit for carrying out a superimposing function process for superimposing an image on an external image displayed by a display element and then displaying the resultant image, comprising:

a memory in which superimpose data is stored;

display timing generating means for generating a display timing signal to be output to the display element in accordance with a control signal input together with the external image;

memory timing generating means for generating a timing signal for controlling the memory in accordance with the control signal input together with the external image;

latch means for temporarily latching external image data and the superimpose data to be displayed; and data comparing/switching means for comparing the superimpose data temporarily latched in the latch means with a default value and for outputting either the external image data or the superimpose data to the display element in response to a comparison result.

According to a first aspect of the invention, since the display control circuit stores the superimpose data in the memory, the optional superimpose data can be set by software. The control signal is input to the display control circuit together with the external image. In accordance with this control signal, the display timing generating means generates the display timing signal to be output to the display element, and the memory timing generating means generates the timing signal for controlling the memory. Since the latch means temporarily latches the external image data and the superimpose data to be displayed, for example, when the external image is a television broadcast image, the latch means can be operated so that the external image data may be synchronized to the superimpose data in accordance with the generated timing signal. The data comparing/switching means compares the superimpose data temporarily latched in the latch means with the default value and then outputs either the external image data or the superimpose data to the display element in response to the comparison result. Therefore, superimposition can be set for each image portion of 1-dot display element, and thus the optional data can be superimposed on the external image.

According to the first aspect of the invention, since the memory stores the superimpose data therein, when the memory is RAM, for example, the optional superimpose data can be set by the software. In accordance with the control signal input together with the external image, the display timing signal to be output to the display element and the timing signal for controlling the memory are generated. Since the external image data and the superimpose data to be displayed are temporarily latched, for example, when the external image is the television broadcast image, the external image data can be synchronized to the superimpose data in accordance with the generated timing signal. The temporarily latched superimpose data is compared with the default value, and either the external image data or the superimpose data is then output to the display element in response to the comparison result. Therefore, the superimposition can be set for 1-dot display element each, and thus the optional data can be superimposed on the external image.

According to a second aspect of the invention, the display control circuit of the first aspect of the invention further comprises function setting means for setting whether or not the superimposing function is enabled.

According to the second aspect of the invention, since the display control circuit has the function for setting whether or not the superimposing function is enabled, whether the superimposing function is turned ON or OFF can be simply set by the software or the like, for example.

According to a third aspect of the invention, the display control circuit of the first aspect is characterized in that the memory is constituted of a RAM, and the memory timing generating means generates a timing for controlling the RAM from the control signal input together with the external image.

According to the third aspect of the invention, the memory is constituted of a dynamic RAM and a static RAM, and the memory timing generating means generates the timing for controlling the RAM from the control signal input together with the external image. Therefore, for example, an inexpensive general-purpose RAM can be used so as to constitute the circuit without the use of an expensive memory for the image only, and thus a cost can be reduced. Alternatively, the memory in the display control circuit of the second aspect may be constituted of a RAM, and the memory timing generating means in the display control circuit of the second aspect may be operated as is the third aspect. With this constitution, it is also possible to reduce the cost of the display control circuit.

According to a fourth aspect of the invention, the display control circuit of the first aspect of the invention further comprises:

image capturing means for capturing data so as to store the external image in an area of the memory in which area the superimpose data is to be stored during the superimposition; and capture setting means for setting whether the function of the image capturing means is turned ON or OFF.

According to the fourth aspect of the invention, the image capturing means captures the data so that the external image may be stored in the area of the memory in which area the superimpose data is to be stored during the superimposition. The capture setting means sets whether the function of the image capturing means is turned ON or OFF. Therefore, an access is made to the memory only when the external image is captured, and thus it is not necessary to capture the external image at all times. Accordingly, for example, when the memory is composed of the dynamic RAM, the low-speed operated dynamic RAM can be used.

As described above, according to the fourth aspect of the invention, when the image capturing function is set to ON, the display control circuit captures the data so that the external image may be stored in the area of the memory in which the superimpose data is stored during the superimposition. Therefore, the access is made to the memory only when the external image is captured, and thus it is unnecessary to always capture the external image. Accordingly, for example, when the memory is composed of the dynamic RAM, the low-speed operated dynamic RAM can be used. Incidentally, the image capturing means and the capture setting means may be added to the display control circuits of the second and third aspect of the invention. In this case, an access is made to the memory only when the external image is captured regardless of the display control circuit of the second or third aspect.

In a fifth aspect of the invention, the display control circuit of the second aspect is characterized in that, when the superimposing function is set to be disabled by the function setting means, only the display timing generating means, the latch means and the data comparing/switching means are operated.

According to the fifth aspect of the invention, the display control circuit operates in the above-mentioned manner when the superimposition is disabled. As a result, the memory and the memory timing generating means are suspended in the case of disabling the superimposition. Accordingly, power consumption of the whole display control circuit in the case of disabling the superimposition can be rather reduced than in the case of enabling the superimposition.

In a sixth aspect of the invention, the display control circuit of the fifth aspect of the invention is characterized in that:

the latch means includes:
an external image data latch for temporarily latching the external image data; and
a superimpose data latch for temporarily latching the superimpose data, and
when the superimposing function is set to be disabled by the function setting means, only the external image data latch from the two latches is operated.

According to the sixth aspect of the invention, the latch means of the display control circuit having the above-mentioned constitution operates in the above-mentioned manner when the superimposition is disabled. As a result, besides the memory and the memory timing generating means, the superimpose data latch is also suspended in the case of disabling the superimposition. Accordingly, power consumption of the whole display control circuit in the case of disabling the superimposition can be rather reduced than in the case of enabling the superimposition.

In a seventh aspect of the invention, the display control circuit of the first aspect of the invention is characterized in that:

the default value is a value representative of a predetermined background color;
the latch means temporarily latches a part of the external image data for designating a color of any one dot of a plurality of dots constituting the display element, and a part of the superimpose data for designating a color of the one dot; and
the data comparing/switching means compares the part of the superimpose data temporarily latched in the latch means with the default value, and outputs the part of the superimpose data if the part of the superimpose data and the default value match, or the part of the external data if the part of the superimpose data and the default value do not match.

According to the seventh aspect of the invention, the latch means and the data comparing/switching means of the display control circuit operates in the above-mentioned manner. By repeating the operation while sequentially changing the any one dot of the plurality of dots, the data comparing/switching means can easily select and output the parts designating the color of all dots of the display element from the two data.

In an eighth aspect of the invention, the display control circuit of the first aspect of the invention is characterized in that, the memory includes a plurality of storage areas each corresponding to the plurality of dots constituting the display element, and
a plurality of parts for designating each color of the plurality of dots in the superimpose data are stored individually in the storage areas each corresponding to the plurality of dots to be used for displaying the image among all dots of the display element.

According to the eighth aspect of the invention, the memory of the display control circuit has the above-mentioned constitution. In this constitution, each storage area in the memory is related to each dot of the display element individually. By controlling the color designated by the part of the superimpose data and the storage area to which the part is written the color designated, it is possible to display an optional image at an arbitrary position in the display element in a simple manner. Furthermore, the memory in the display control circuit according to the seventh aspect may have the above-mentioned constitution. In this case, the default value presetting the background color is stored in the storage areas other than the storage areas storing the parts of the superimpose data, and the part of the superimpose data is read out from any one of the storage areas every time the latch means executes the data comparison, to thereby display the image.

BRIEF DESCRIPTION OF THE DRAWINGS

Other and further objects, features, and advantages of the invention will be more explicit from the following detailed description taken with reference to the drawings wherein:

FIGS. 6A and 6B are timing charts at the time of capturing a television broadcast image in the embodiment of FIG. 1;

DETAILED DESCRIPTION OF THE PREFERRED EMBODIMENTS

Figure 1:
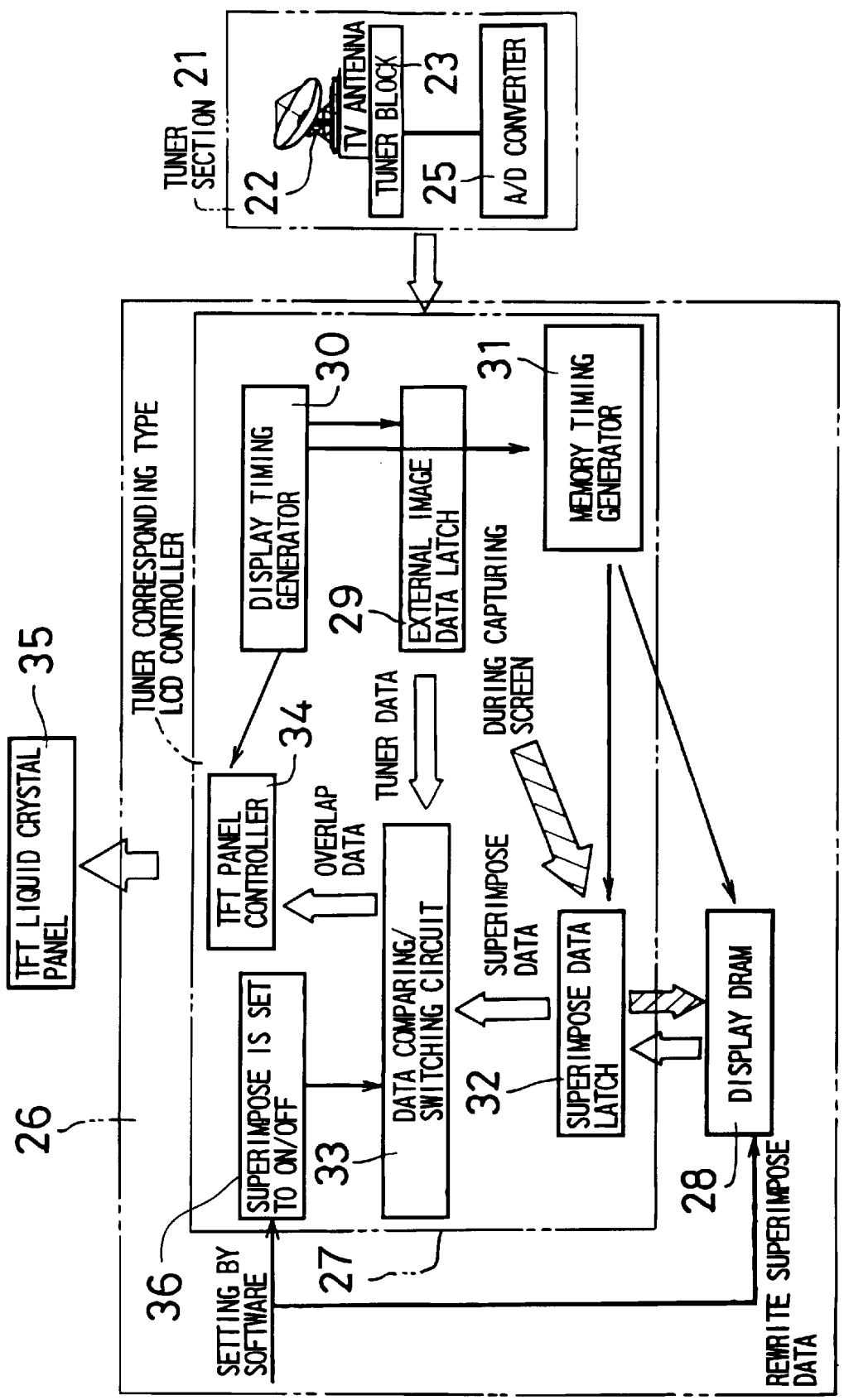
FIG. 1 is a block diagram showing a constitution of a display control circuit according to an embodiment of the invention and a peripheral device.

Now referring to the drawings, preferred embodiments of the invention are described below.

FIG. 1 shows a constitution associated with a display control circuit according to an embodiment of the invention. A tuner section 21 comprises a television broadcast wave receiving antenna 22 for receiving a television broadcast wave; a tuner block 23 for detecting a component associated with an image from the television broadcast wave and for extracting an analog signal; and an A/D converter 25 for converting tuner image data in the analog signal extracted by the tuner block 23 into a digital signal. The digital signal output from the tuner section 21 is input to a display control circuit 26. The display control circuit is included in an information processing apparatus, for example.

The display control circuit 26 comprises a tuner corresponding type LCD controller 27 and a display DRAM 28 which is a general-purpose DRAM. The tuner corresponding type LCD controller 27 includes an external image data latch 29, a display timing generator 30, a memory timing generator 31, a superimpose data latch 32, a data comparing/switching circuit 33, a TFT panel controller 34 and a function set indicator 56.

The digitized tuner image data is temporarily latched in the external image data latch 29. A control signal such as a horizontal synchronizing signal HSYNC, a vertical synchronizing signal VSYNC and a data latch clock DCLK is input to the display timing generator 30 and the memory timing generator 31. In accordance with the control signal input from the tuner section 21, the display timing generator 30 generates a timing signal for controlling a TFT liquid crystal panel 35. The memory timing generator 31 generates an access timing signal of the display DRAM 28 in accordance with the control signal input from the tuner section 21.

When a superimposing function is set to ON by software executed by the information processing apparatus, optional superimpose data is previously set in the display DRAM 28 by the software. The superimpose data latch 32 temporarily latches the superimpose data stored in the display DRAM 28 in accordance with the timing signal generated from the memory timing generator 31. The superimpose data latched in the superimpose data latch 32 is output to the data comparing/switching circuit 33 in synchronization with the timing of the tuner image data.

The tuner image data output from the external image data latch 29 and the superimpose data output from the superimpose data latch 32 are input to the data comparing/switching circuit 33 at the timing of the tuner image data. The superimpose data has a background color preset by the software. For 1-dot display element each, the data comparing/switching circuit 33 makes a comparison as to whether or not the color of the superimpose data is identical to the background color. As a result of comparison, when the color of the superimpose data is identical to the background color, the tuner image data is output to the TFT panel controller 34. When the color of the superimpose data is different from the background color, the superimpose data is output to the TFT panel controller 34. Thus, when a television broadcast image display mode is selected in the information processing apparatus, the software first rewrites the contents of the display DRAM 28 to the background color of the superimpose data.

An output of the data comparing/switching circuit 33 is input to the TFT panel controller 34 as overlap data obtained by superimposing the superimpose data on the tuner image data. The TFT panel controller 34 outputs the overlap data to the TFT liquid crystal panel 35 in accordance with the timing signal generated by the display timing generator 30.

When the superimposing function is set to OFF by the software, the tuner image data alone output from the external image data latch 29 is input to the data comparing/switching circuit 33. The data comparing/switching circuit 33 outputs the tuner image data as it is to the TFT panel controller 34.

Figure 2:
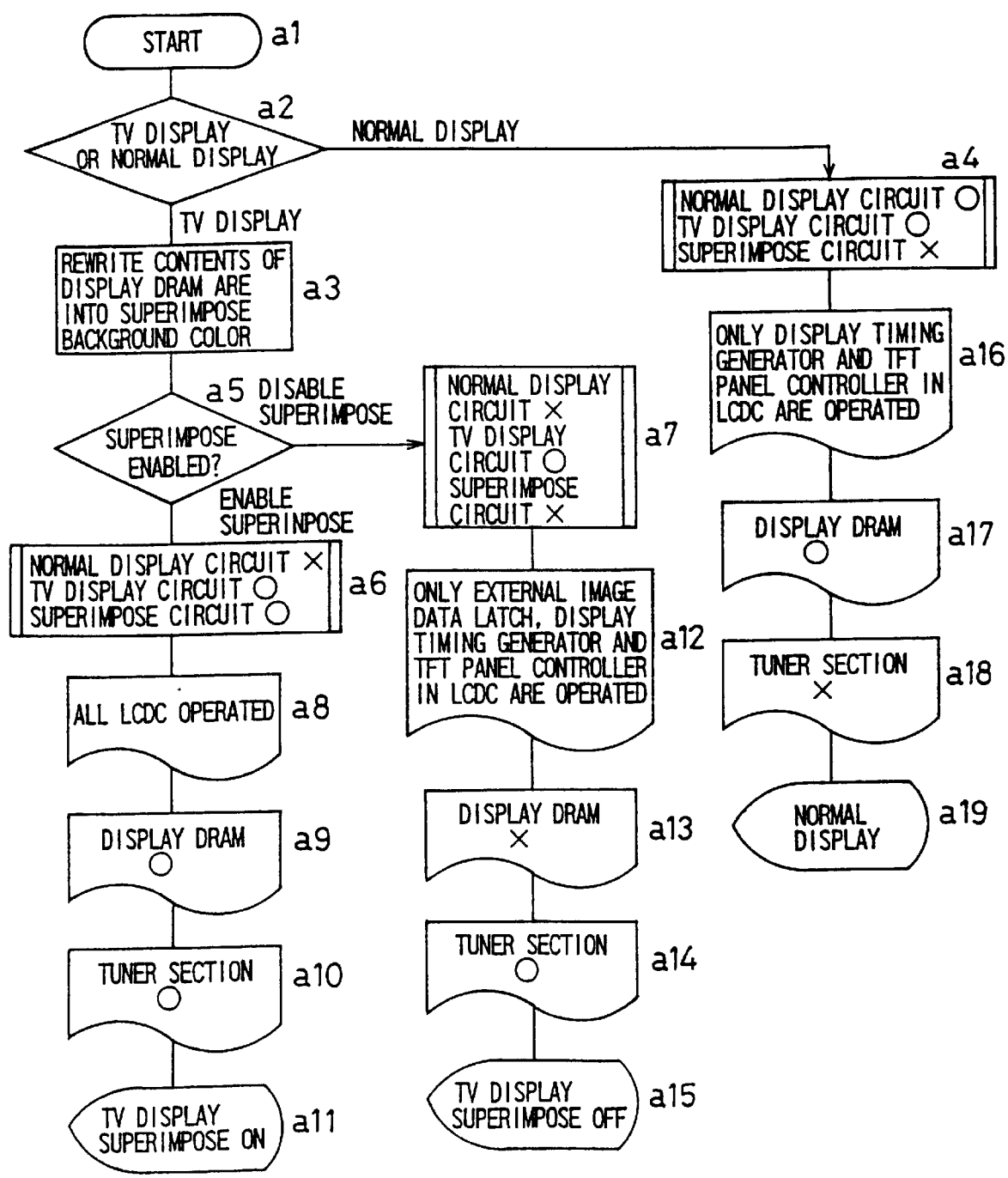
FIG. 2 is a flow chart showing a display operation of an information processing apparatus having the display control circuit of the embodiment of FIG. 1.

FIG. 2 shows a display operation of the information processing apparatus having the display control circuit according to the embodiment of the invention shown in FIG. 1. The operation is started at step a1. In step a2, a determination is made as to whether the television broadcast image display mode or normal display mode is selected. When the television broadcast image display mode is selected, the operation proceeds to step a3. When the normal display mode is selected, the operation proceeds to step a4.

In step a2, the television broadcast image display mode is selected. In this case, in step a3, all the data stored in the display DRAM 28 is rewritten to background color data at the time of superimposition. Then, the operation proceeds to step a5. In step a5, whether or not the superimposing function is enabled is determined. When it is determined that the superimposing function is enabled, the operation proceeds to step a6. When the function is disabled, the operation proceeds to step a7.

When the superimposing function is enabled in step a5, the functions of an external-image-display-related circuit and a superimposition-related circuit in the information processing apparatus are set to ON in step a6. On the basis of the setting in step a6, in step a8, the setting is done so that all the circuits in the tuner corresponding type LCD controller 27 may be operated. In step a9, the setting is done so that the display DRAM 28 may be used, and the superimpose data is written to the display DRAM 28 by the software. In step a10, the setting is done so that the signal from the tuner section 21 may be captured into the tuner corresponding type LCD controller 27. After that, in step a11, in accordance with the operation of each circuit, the image based on the overlap data composed of the tuner image data and the superimpose data is displayed on the TFT liquid crystal panel 35.

When it is determined that the superimposing function is disabled in step a5, the function of the external-image-display-related circuit alone in the information processing apparatus is set to ON in step a7. On the basis of the setting in step a7, in step a12, the setting is done so that the external image data latch 29, the display timing generator 30 and the TFT panel controller 34 in the tuner corresponding type LCD controller 27 may be operated. In step a13, the setting is done in such a manner that the display DRAM 28 is not used. In step a14, the setting is done so that the signal from the tuner section 21 may be captured into the tuner corresponding type LCD controller 27. After that, in step a15, in accordance with the operation of each circuit, the image based on the tuner image data is displayed on the TFT liquid crystal panel 35.

When the normal display mode is selected in step a2, the function of a normal-display-related circuit in the information processing apparatus is set to ON in step a4. On the basis of the setting in step a4, in step a16, the setting is done so that the display timing generator 30 and the TFT panel controller 34 in the tuner corresponding type LCD controller 27 may be operated. In step a17, the setting is done so that the display DRAM 28 may be used. In step a18, the setting is done in such a manner that the signal from the tuner section 21 may not be captured into the tuner corresponding type LCD controller 27. After that, in step a19, the display timing generator 30 generates the timing signal in accordance with a clock signal in the information processing apparatus. In accordance with the timing signal transmitted from the display timing generator 30 to the display DRAM 28 and the TFT panel controller 34, the TFT liquid crystal panel 35 performs the normal display.

Figure 3:
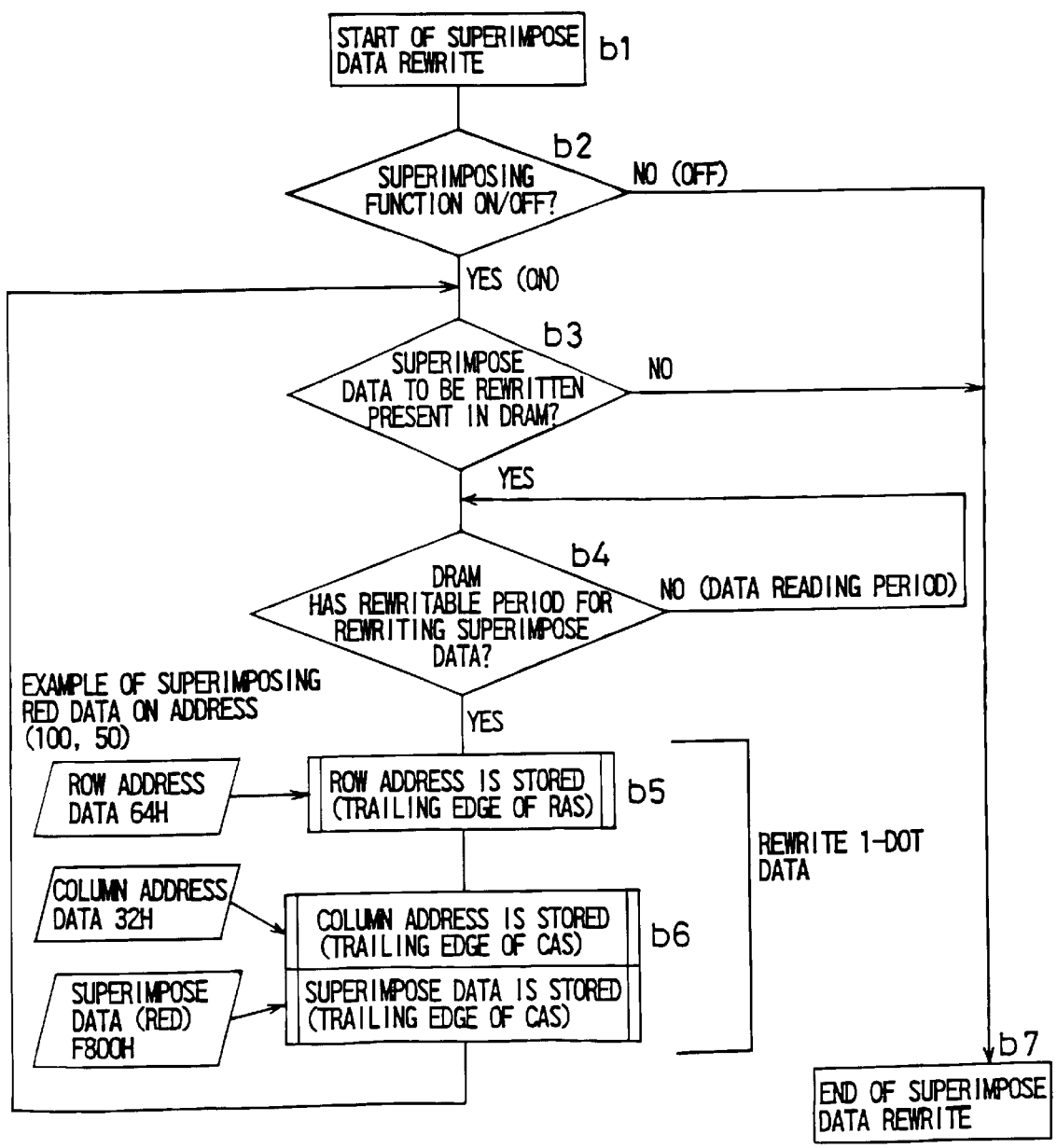
FIG. 3 is a flow chart illustrating an operation for writing superimpose data in one address of a display DRAM 28 in the embodiment of FIG. 1.

FIG. 3 shows an operation for writing the 1-dot superimpose data to the display DRAM 28 by the software. The operation is started at step b1. In step b2, whether or not the superimposing function is set to ON is determined. When the superimposing function is set to ON, the operation proceeds to step b3. When the superimposing function is set to OFF, the operation is completed. When the superimposing function is set to ON in step b2, whether or not the superimpose data to be written to the display DRAM 28 is present is determined in step b3. When the superimpose data is present, the operation proceeds to step b4. When the superimpose data is absent, the operation is completed. When the superimpose data is present in step b3, the determination is made in step b4 as to whether or not the display DRAM 28 is in such a rewritable state that the superimpose data can be rewritten. When the display DRAM 28 is in the rewritable state, the operation proceeds to step b5. When the display DRAM 28 is not in the rewritable state, waiting is kept until the display DRAM 28 reaches the rewritable state.

When the determination is made in step b4 that the display DRAM 28 is in the rewritable state, ROW address data indicating an address to be rewritten is stored in accordance with a trailing edge of an RAS (Row Address Strobe) signal input to the display DRAM 28 in step b5. In step b6, in accordance with the trailing edge of a CAS (Column Address Strobe) signal input to the display DRAM 28, COLUMN address data indicating the address to be rewritten is stored. The superimpose data is stored in the address of the display DRAM 28 determined by the above-mentioned procedure. After that, the operation proceeds to step b3. When the rewrite of the data to the display DRAM 28 is completed, the operation is completed in step b7.

The capacity of the display DRAM 28 is determined depending on the display size of the TFT liquid crystal panel 35 and the number of display colors. Described is the embodiment in which the TFT liquid crystal panel 35 is of the display size of 320×240 dots and is of 65536 display colors. 65536 colors are equal to the number of colors when an RGB signal is composed of total 16 bits constituted of a 5-bit R signal, a 6-bit G signal and a 5-bit B signal. Since one address of the display DRAM 28 stores 16-bit data therein, display color data per dot of the TFT liquid crystal panel 35 is stored in one address of the display DRAM 28. In the embodiment, the capacity of the display DRAM 28 requires 320×240×16(bits)=1228800(bits) at a minimum. The display DRAM 28 comprises a special DRAM with this capacity or the general-purpose DRAM of this capacity or more. Since the general-purpose DRAM of 2 Mbits is not mass-produced and few DRAMs are thus available, it is assumed that the display DRAM 28 is composed of the general-purpose DRAM of 4 Mbits. In this case, 9 bits each are assigned to a ROW address and a COLUMN address.

In the case of the normal display mode, the display DRAM 28 stores bit map image data to be output to the TFT liquid crystal panel 35 as it is. When the superimpose data is to be written in the display DRAM 28 by the software, which dot of the TFT liquid crystal panel 35 one address of the display DRAM 28 corresponds to is determined by the tuner corresponding type LCD controller 27. In the embodiment, for a simple correspondence between the address in the display DRAM 28 and the dot of the TFT liquid crystal panel 35, the ROW address corresponds to a horizontal direction of the TFT liquid crystal panel 35, while the COLUMN address corresponds to a vertical direction thereof.

For example, on the TFT liquid crystal panel 35, it is assumed that a coordinate at a left-upper corner is set to (0, 0) and a coordinate at a right-lower corner is set to (320, 240). In this case, the description is given for the operation to allow the display DRAM 28 to store the data for displaying red on the dot positioned on a coordinate (100, 50). In step b5 of FIG. 3, ROW address data 64H is stored. In step b6, COLUMN address data 32H is stored. At this time, the address in the display DRAM 28 corresponding to the dot situated on the coordinate (100, 50) on the TFT liquid crystal panel 35 is designated, and red superimpose data F800H is stored in this corresponding address.

By the operation shown in a flow chart of FIG. 3, optional color data can be stored in an optional address in the display DRAM 28 corresponding to a dot on the TFT liquid crystal panel 35. In such a manner, optional superimpose data can be displayed on the TFT liquid crystal panel 35.

Although the flow chart of FIG. 3 illustrates the rewrite of the data of one address in the display DRAM 28, a high-speed page mode access can be made in the embodiment because the RAS signal of the same horizontal address is input in common.

Figure 4A:
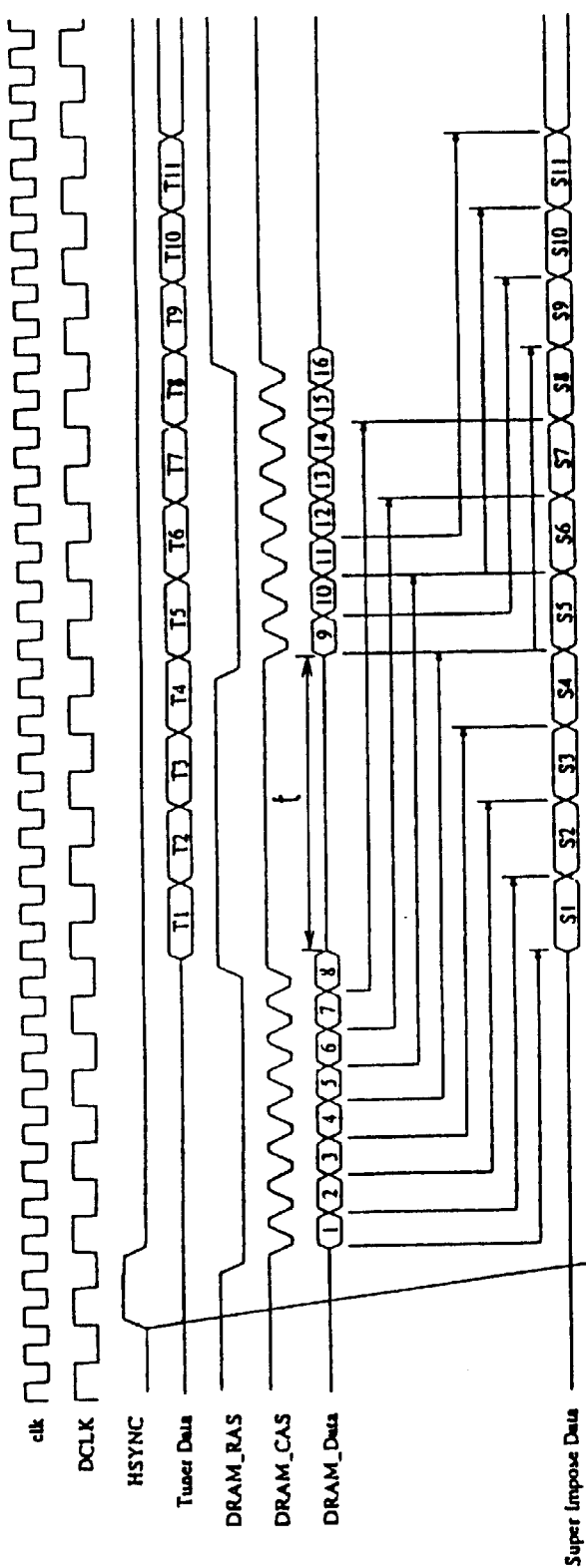
FIGS. 4A and 4B are timing charts of each signal at the time of setting a superimposing function to ON in the embodiment of FIG. 1.
Figure 4B:
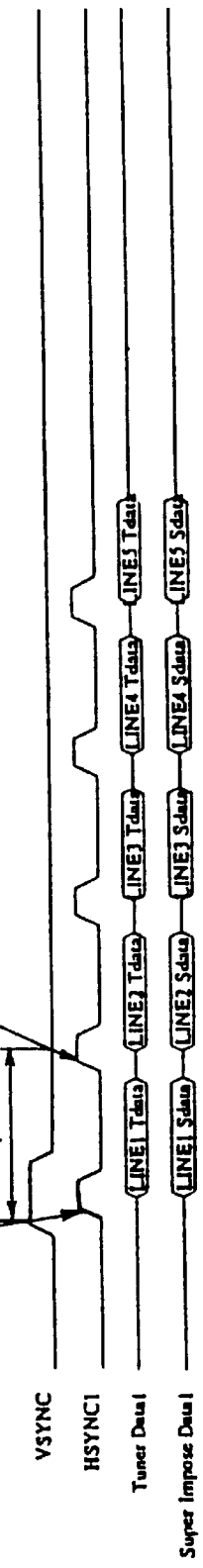

FIGS. 4A and 4B show the timing of each signal at the time of setting the superimposing function to ON in the embodiment of FIG. 1. FIG. 4A is a horizontal timing chart, and FIG. 4B is a vertical timing chart. FIG. 4A shows, in descending order, a clock signal clk of double frequency type of a data latch clock DCLK; the data latch clock DCLK, a horizontal synchronizing signal HSYNC and tuner image data Tuner Data captured from the tuner section 21; an RAS signal DRAM_RAS and a CAS signal DRAM_CAS generated from the memory timing generator 31; superimpose data DRAM_Data stored in the display DRAM 28; and superimpose data SID (Super Impose Data) output from the superimpose data latch 32. FIG. 4B shows, in descending order, the vertical synchronizing signal VSYNC, the horizontal synchronizing signal HSYNC and the tuner image data Tuner Data captured from the tuner section 21; and the superimpose data SID output from the superimpose data latch 32. In FIGS. 4A and 4B, a time period T indicating a time interval between successive leading edges of the horizontal synchronizing signal HSYNC is equal to the time required for transmitting the display data of one horizontal line.

In the data comparing/switching circuit 33, the switching between the tuner image data and the superimpose data requires the synchronization of the superimpose data to the tuner image data. Thus, the superimpose data latch 32 temporarily latches the superimpose data stored in the display DRAM 28. The timing signal for the aforementioned operation is generated by the memory timing generator 31.

The memory timing generator 31 generates the clock signal clk of double frequency type of the data latch clock DCLK. Then, the level change of this clock signal clk is used so as to generate the RAS signal DRAM_RAS and the CAS signal DRAM_CAS for use in the high-speed page mode access. The RAS signal DRAM_RAS and the CAS signal DRAM_CAS are output to the display DRAM 28 in accordance with the leading edge of the horizontal synchronizing signal HSYNC which is a horizontal start signal.

By the RAS signal DRAM_RAS and the CAS signal DRAM_CAS, the 8-address superimpose data DRAM_Data stored in the display DRAM 28 is read by means of the high-speed page mode access and is temporarily latched in the superimpose data latch 32. The memory timing generator 31 outputs the data latch clock DCLK to the superimpose data latch 32. In accordance with the data latch clock DCLK, the superimpose data latch 32 synchronizes the superimpose data SID to the tuner image data Tuner Data while it sequentially outputs the superimpose data SID to the data comparing/switching circuit. The read of the subsequent 8-address data is started after a constant time period T from the completion of the read of the preceding 8-address data so that the data output from the superimpose data latch 32 may be consecutive data.

In the display DRAM 28, the data can be rewritten to the already read address during the time period T in which the data is not read.

As shown in FIG. 4B, the leading edge of the horizontal synchronizing signal HSYNC is generated in accordance with the leading edge of the vertical synchronizing signal VSYNC, namely, a vertical start signal. When the data of 320 dots, that is, of one horizontal line is read in accordance with the leading edge of the preceding horizontal synchronizing signal HSYNC, the data of the subsequent one horizontal line is read by the leading edge of the subsequent horizontal synchronizing signal HSYNC. This is repeated so as to read the data of 240 horizontal lines, whereby the superimpose data of one screen is read.

Figure 5:
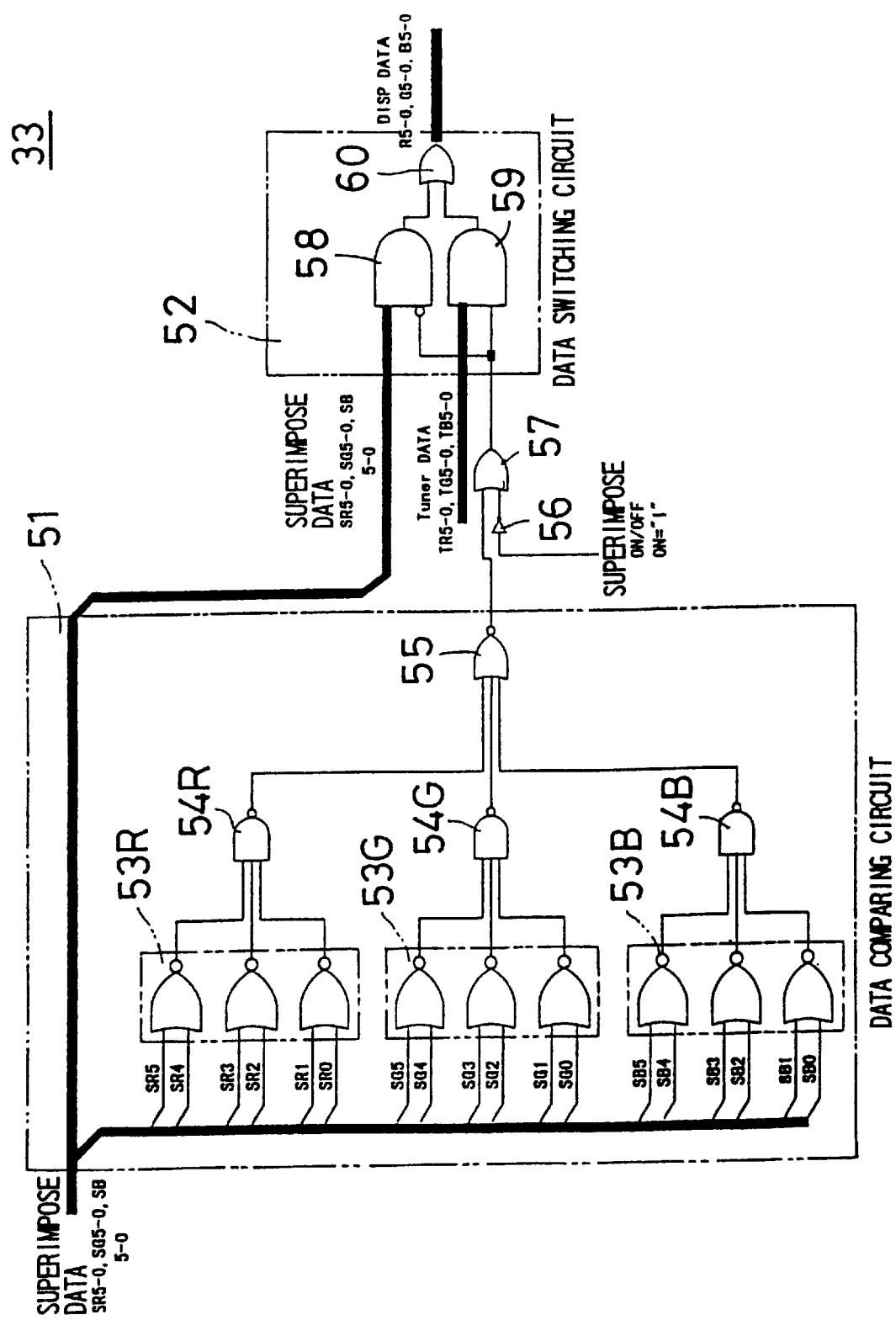
FIG. 5 is a circuit diagram showing an exemplary constitution of a data comparing/switching circuit 33 according to the embodiment of FIG. 1.
Figure 7:
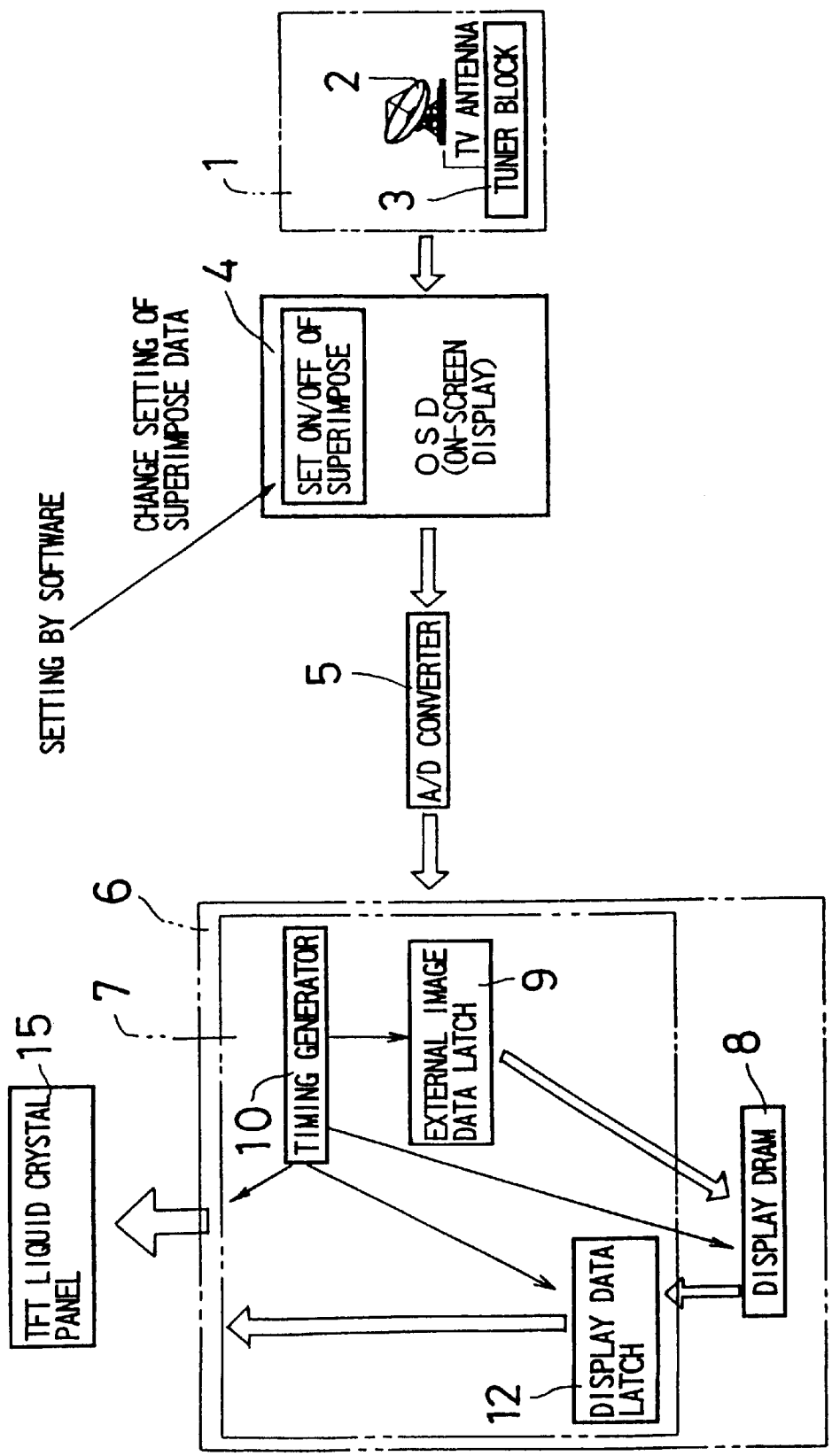
FIG. 7 is a block diagram of the constitution for carrying out the superimposing function for the television broadcast image in a conventional information processing apparatus having an LCD.
Figure 8:
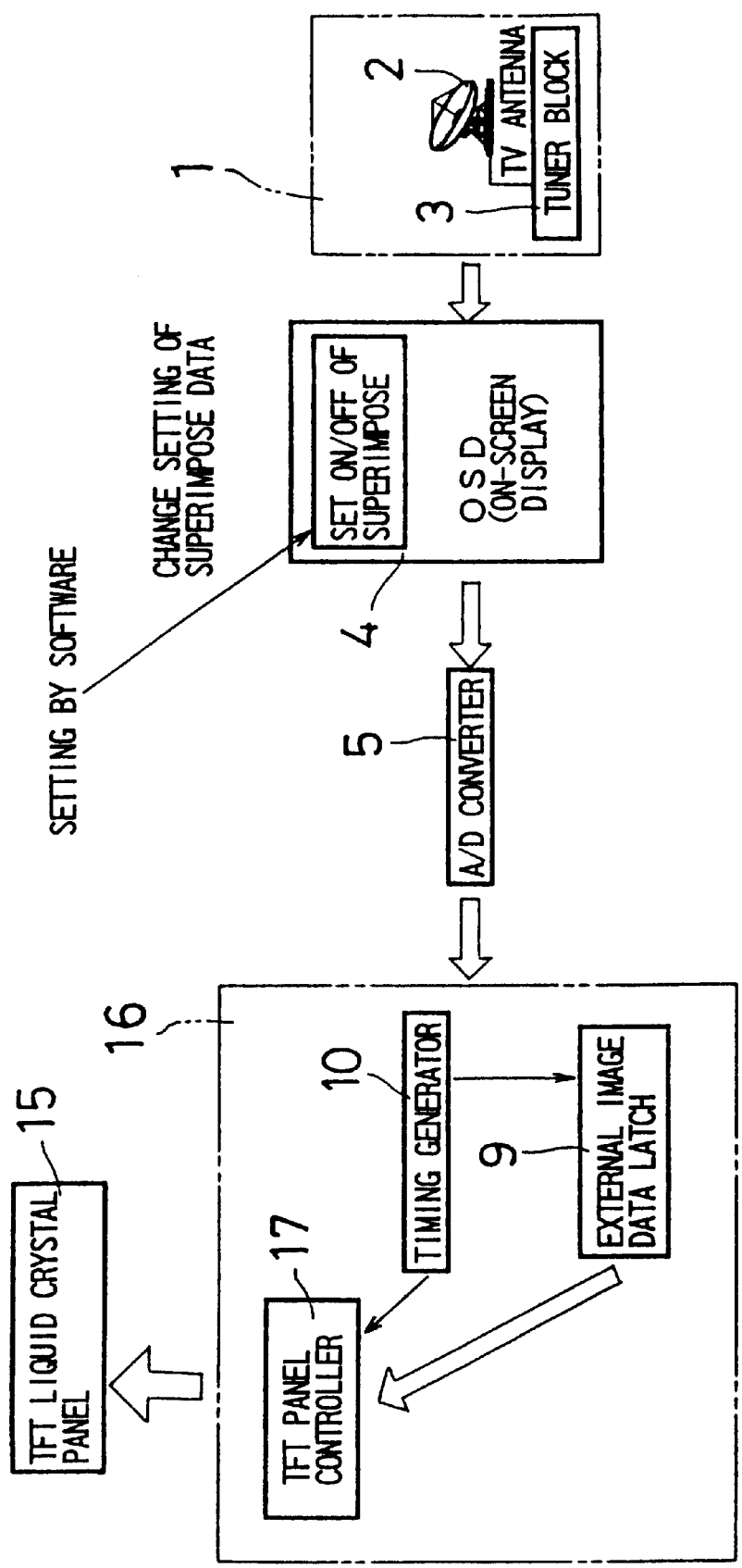
FIG. 8 is a block diagram of the constitution for carrying out the superimposing function in a conventional liquid crystal television broadcast receiver.

FIG. 5 shows an exemplary constitution of the data comparing/switching circuit 33 according to the embodiment of FIG. 1. The data comparing/switching circuit 33 includes a data comparing circuit 51 and a data switching circuit 52. The superimpose data of each dot on the TFT liquid crystal panel 35 is composed of six R signals SR0–SR5, six G signals SG0–SG5 and six B signals SB0–SB5. Any one of the R signals and any one of the B signals are always at low level, while other 16-bit RGB signal is used so as to designate the color of each dot. In the following description, a logical value "1" and a logical value "0" are allocated to a high level and a low level, respectively. It is also assumed that the background color of the superimpose data is set to white. That is, it is assumed that all the 16-bit superimpose data corresponding to the background is 0.

The superimpose data is input to the data comparing circuit 51. In the data comparing circuit 51, the NOR of each set of R, G, B color signals is first computed by NOR gate groups 53R, 53G and 53B, each being constituted of three 2-input NOR gates. Then, these outputs are input to 3-input NAND gates 54R, 54G and 54B for each set of R, G, B color signals, so that the NAND is computed. The computation results of the NAND gates 54R, 54G and 54B are input to a 3-input NOR gate 55 together, so that the NOR is computed. As a result, when "1" is included in any of the 16-bit superimpose data, the data comparing circuit 51 outputs "0".

On the other hand, when all the 16 bits are "0", the data comparing circuit 51 outputs "1".

The software inputs a superimposing function setting signal of "1" to the data comparing/switching circuit 33 when the superimposing function is set to ON. On the contrary, the software inputs a superimposing function setting signal of "0" to the data comparing/switching circuit 33 when the superimposing function is set to OFF. The superimposing function setting signal is inverted by an inverter 56, and then the inverted signal is input to an OR gate 57 together with the output of the data comparing circuit 51. Consequently, the OR gate 57 outputs "0" when the software sets the superimposing function to ON and "1" is included in any of the 16-bit superimpose data. On the other hand, the OR gate 57 outputs "1" when the superimposing function is set to OFF or all the 16-bit superimpose data is "0".

In the data switching circuit 52, an AND gate 58 computes the AND of the 18-bit superimpose data SR0–SR5, SG0–SG5, SB0–SB5 and the signal obtained by inverting the output from the OR gate 57. As a result, the AND gate 58 outputs the superimpose data when the superimposing function is set to ON. On the other hand, the AND gate 58 outputs "0" at all times when the superimposing function is set to OFF.

One R signal each and one B signal each whose values are fixed to "0" are also added to the tuner image data so that the tuner image data may correspond to the 18-bit superimpose data including one R signal and one G signal whose values are fixed to "0". By an AND gate 59, the 18-bit tuner image data TR0–TR5, TG0–TG5, TB0–TB5 and the output from the OR gate 57 are ANDed. As a result, the AND gate 59 outputs "0" at all times when the superimposing function is set to ON. When the superimpose data has the same color as the background color, the tuner image data is output. When the superimposing function is set to OFF, the tuner image data is always output.

The outputs of the AND gates 58, 59 are input to an OR gate 60, so that the OR is computed. Consequently, the OR gate 60 outputs the superimpose data when the superimposing function is set to ON and the superimpose data has the color differing from the background color. When the superimpose data has the same color as the background color, the tuner image data is output. When the superimposing function is set to OFF, the tuner image data is always output. The outputs R0–R5, G0–G5, B0–B5 of the OR gate 60 are equivalent to 1-dot display data. The data of all the dots is compared/switched so as to thereby form the overlap data of the tuner image and the superimpose image.

When the background color of the superimpose data is set to color other than white, before the 18-bit superimpose data SR0–SR5, SG0–SG5, SB0–SB5 is input to the NOR gate groups 53R, 53G, 53B, the exclusive OR of the 18-bit superimpose data and the corresponding background color data is computed. As a consequence, when the superimpose data has the same color as the background color, "0" is input to all the NOR gate groups 53R, 53G, 53B. The following process is carried out in the same manner as the case of the white background color.

FIGS. 6A and 6B show the timing at the time of capturing the television broadcast image into the display DRAM 28 in the embodiment of FIG. 1. FIG. 6A is a horizontal timing chart, and FIG. 6B is a vertical timing chart. FIG. 6A shows, in descending order, the clock signal clk; the data latch clock DCLK; the horizontal synchronizing signal HSYNC; the tuner image data Tuner Data; the data SID captured into the superimpose data latch 32; the RAS signal DRAM_RAS; the CAS signal DRAM_CAS; a WE (Write Enable) signal DRAM_WE which is a write enable signal to the display DRAM 28; and the data DRAM_Data captured into the display DRAM 28.

FIG. 6B shows, in descending order, the vertical synchronizing signal VSYNC; the horizontal synchronizing signal HSYNC; the tuner image data Tuner Data; and the data SID captured into the superimpose data latch 32.

Although the timings for making an access to the display DRAM 28 differ in access start between the time of capturing the external image and the time of reading the superimpose data to the superimpose data latch 32, the access is made in the same manner. More specifically, the waveform charts DRAM_RAS and DRAM_CAS among the timing charts in FIG. 6A representing the access timing of the display DRAM at the time of capturing the external image, when they are moved parallel to the time axis, correspond to the waveform charts DRAM_RAS and DRAM_CAS among the timing charts in FIG. 4A representing the access timing at the time of reading the superimpose data to the superimpose data latch 32. Therefore, these two access timings can be common to each other. The superimpose data latch 32 can be also used as a captured image data latch at the time of capturing the external image.

The memory timing generator 31 generates the clock signal clk for multiplexing the data latch clock DCLK; the RAS signal DRAM_RAS, the CAS signal DRAM_CAS and the WE signal DRAM_WE which serve as the access timing signals of the display DRAM 28. The tuner image data Tuner Data is first latched in the external image data latch 29. During the time period when the tuner section 21 sends the tuner image data Tuner Data corresponding to one dot on the TFT liquid crystal panel 35, the clock signal clk rises twice. The tuner image data Tuner Data corresponding to each dot is latched in the superimpose data latch 32 in synchronization with the pulse edge of the second rise of the clock signal clk.

The capture of the external image requires the capture of one-screen information. Thus, the leading edge of the vertical synchronizing signal VSYNC that is the start signal of the data of one screen is set to a trigger signal for the capture of the external image. When the memory timing generator 31 detects the leading edge of the horizontal synchronizing signal HSYNC following the leading edge of the vertical synchronizing signal VSYNC, it generates the RAS signal DRAM_RAS, the CAS signal DRAM_CAS and the WE signal DRAM_WE for the high-speed page mode access of the display DRAM 28 from the level change of the clock signal clk.

In accordance with the trailing edge of the RAS signal DRAM_RAS generated from the memory timing generator 31, the display DRAM 28 determines the ROW address in which the data is captured. Then, in accordance with the eight successive trailing edges of the CAS signal DRAM_CAS, the eight COLUMN addresses having the same ROW address are designated. By the eight timings of the WE signal DRAM_WE which are generated at the same time that the CAS signal DRAM_CAS is generated, the external image data in the superimpose data latch 32 is stored in the display DRAM 28. This is repeated, whereby the external image can be captured in the display DRAM 28.

As described above, the display control circuit stores the external image data in the display DRAM. More specifically, the display control circuit has few circuit parts exclusively used for capturing an external image, but accesses to the display DRAM only at the time of capturing an external image for displaying the external image. As a consequence, a DRAM operating at a low speed can be used as the display DRAM.

In the description, the display DRAM can be replaced by a memory such as a general-purpose static RAM. Although the TFT liquid crystal panel is used as the display element, other LCD elements or CRT, etc. can be used. The television broadcast image as the external image can be used in the form of any one of an NTSC system, a PAL system or other systems. The external image may be a reproducing signal of an image recording medium such as VTR and DVD.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A display control circuit for carrying out a superimposing function process for superimposing an image on an external image displayed by a display comprising a plurality of display elements and then displaying a resultant image, comprising:

a memory comprising memory locations each of which corresponds to one of the display elements, wherein superimpose data is stored in these memory locations during the superimposing function process of a first operating mode and the external image data is stored in these memory locations during a second, image-capturing operating mode;

display timing generating means for generating a display timing signal to be output to the display in accordance with a control signal input together with the external image;

a first data latch for temporarily latching the external image data during the superimposing function process of the first operating mode and a second data latch for temporarily latching the superimpose data during the superimposing function process of the first operating mode;

timing generating means for generating a timing signal in accordance with the control signal for synchronizing the superimpose data in the second data latch to the external image data; and data comparing/switching means operable during the superimposing function process of the first operating mode for comparing for each display element the superimpose data temporarily latched in the second data latch with a default value and for outputting either the external image data from the first data latch or the superimpose data from the second data latch to the display in response to a comparison result.

2. The display control circuit of claim 1, further comprising function setting means for setting whether or not the superimposing function is enabled.

3. The display control circuit of claim 1, wherein the memory is constituted of a RAM, and the memory timing generating means generates a timing for controlling the RAM from the control signal input together with the external image.

4. The display control circuit of claim 1, further comprising:

capture setting means for setting whether the second, image-capturing operating mode of the display control circuit is ON or OFF; and image capturing means for capturing data when the second, image-capturing operating mode is ON so as to store the external image data in an the memory by first latching the external image data in the first data latch and then storing the latched external image data in an area of the memory in which the superimpose data is stored during the superimposing function process of the first operating mode.

5. The display control circuit of claim 2, wherein when the superimposing function is set to be disabled by the function setting means during a non-superimposing function process of the first operating mode, the display timing generating means, the latch means and the data comparing/switching means, but not the memory, are operated.

6. The display control circuit of claim 5, wherein when the superimposing function is set to be disabled by the function setting means, the first data latch, but not the second data latch, is operated.

7. The display control circuit of claim 1, wherein the default value is a value representative of a predetermined background color;

the latch means temporarily latches a part of the external image data for designating a color of any one dot of a plurality of dots constituting the display element, and a part of the superimpose data for designating a color of the one dot; and the data comparing/switching means compares the part of the superimpose data temporarily latched in the latch means with the default value, and outputs the part of the superimpose data if the part of the superimpose data and the default value match, or the part of the external data if the part of the superimpose data and the default value do not match.

8. The display control circuit of claim 1, wherein a plurality of parts for designating each color of the plurality of display elements in the superimpose data are stored individually in the memory locations each corresponding to the display elements to be used for displaying the image among all display elements of the display.

* * * * *